United States Patent [19]

Edelman et al.

[11] 4,002,517
[45] Jan. 11, 1977

[54] TACKED FILM ROLL AND METHOD OF MAKING SAME

[75] Inventors: Robert I. Edelman, Rochester; Willis L. Stockdale, Fairport; Robert A. Sylvester, Hilton; Corrado Zollo, Rochester, all of N.Y.

[73] Assignee: Eastman Kodak Company, Rochester, N.Y.

[22] Filed: Dec. 24, 1975

[21] Appl. No.: 644,228

Related U.S. Application Data

[62] Division of Ser. No. 499,381, Aug. 21, 1974, Pat. No. 3,958,870.

[52] U.S. Cl. .................. 156/73.4; 96/27 R; 156/306; 156/580.1; 242/194; 352/78 R; 352/156
[51] Int. Cl.² .......................... B32B 31/20
[58] Field of Search ............ 96/27 R, 78; 352/78 R, 352/156; 242/194; 156/306, 73.4, 73.1, 580.1

[56] References Cited
UNITED STATES PATENTS

| | | | |
|---|---|---|---|
| 3,234,024 | 2/1966 | Leinonen | 96/78 |
| 3,451,818 | 6/1969 | Wareham | 96/78 |

*Primary Examiner*—Edward G. Whitby
*Attorney, Agent, or Firm*—K. D. Fosnaught

[57] ABSTRACT

A wound roll of filmstrip of the type having a photographic emulsion layer on one strip face and a raised stripe disposed along one edge of the opposite strip face is so formed as to produce temporary adhesion between the stripe of one convolution and the emulsion layer of an adjacent convolution. Such adhesion or tacking, restricts relative movement of the convolutions, thereby avoiding effective axial expansion of the roll and the resultant generation of undue frictional forces during advancement of the strip through a cartridge in which it is housed.

Such tacking may be achieved by forming the strip into a roll and by so applying energy to a flat end face of the roll as to cause localized melting of the emulsion layer of one convolution at its interface with the raised stripe of an adjacent convolution, whereupon subsequent cooling and rehardening of the emulsion produces adhesion of the convolutions at such interface.

In a preferred method of practicing such invention, a wound but untacked roll is supported at one end face by a wall of an unassembled cartridge body and is positioned beneath a movable heating platen. When the platen is placed in contact with the opposite end face of the roll, a desired quantum of heat may be transferred to the wound strip to produce the above-mentioned melting and the resultant tack.

4 Claims, 7 Drawing Figures

U.S. Patent  Jan. 11, 1977  4,002,517
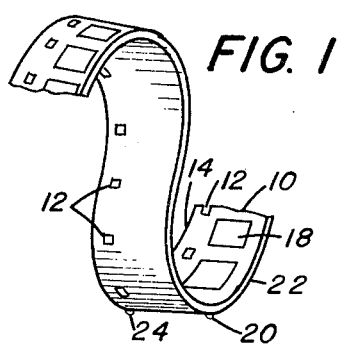
FIG. 1
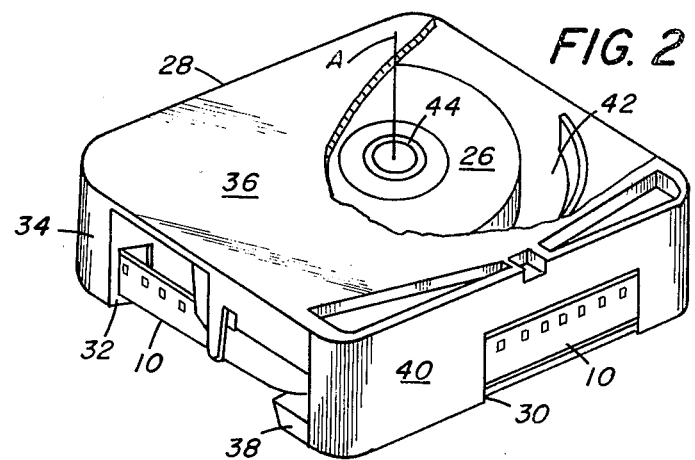
FIG. 2
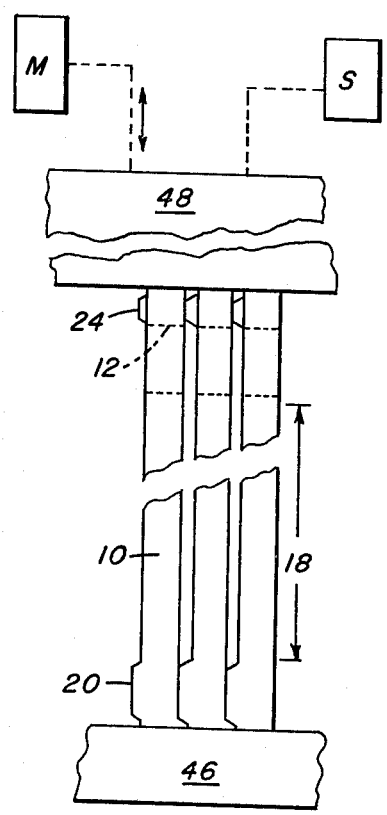
FIG. 4
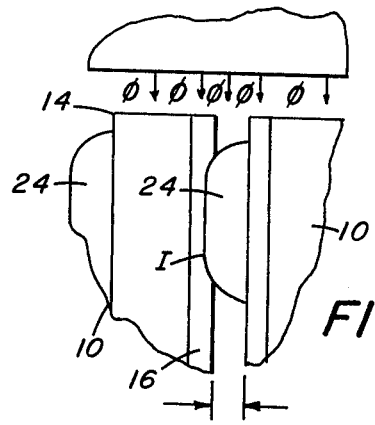
FIG. 5
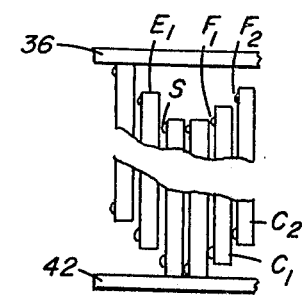
FIG. 3
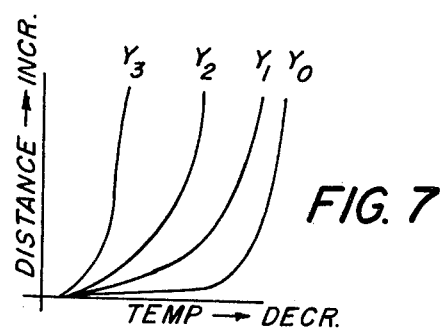
FIG. 7
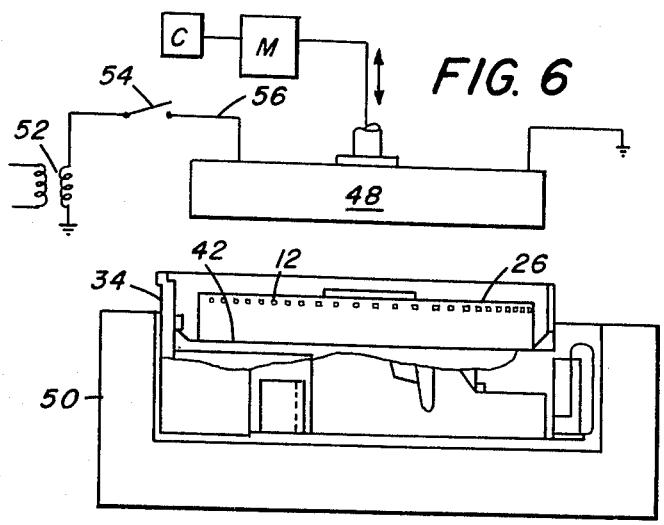
FIG. 6
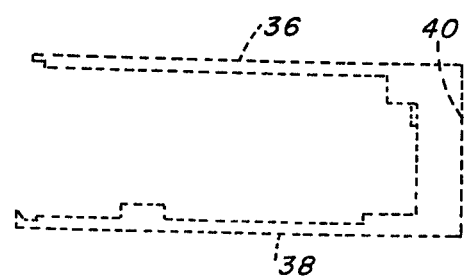

TACKED FILM ROLL AND METHOD OF MAKING SAME

This is a division of application Ser. No. 499,381 filed Aug. 21, 1974, now U.S. Pat. No. 3,958,870.

CROSS-REFERENCE TO RELATED APPLICATIONS

Reference is made to the commonly-assigned U.S. Pat. application Ser. No. 336,142 filed Feb. 26, 1973 now U.S. Pat. No. 3,858,968 in the names of Stephen H. Miller et al and entitled "FILM CARTRIDGE".

BACKGROUND OF THE INVENTION

1. Field of the Invention

This invention relates to cartridge-loaded film for use in motion picture cameras and the like, and in particular to film of the type wherein one film surface carries a raised stripe of sound recording material and a raised balance stripe.

2. Description Relative to the Prior Art

U.S. Pat. No. 3,208,686 entitled "Film Cartridge" and issued on Sept. 28, 1965 in the names of Mr. Evan A. Edwards et al discloses a "super 8" type film cartridge for use in motion picture cameras. Such a cartridge includes a supply chamber wherein a coreless roll of motion picture film is positioned around a stationary post such that the film may be unwound and advanced along a film path, past an exposure aperture and rewound onto a rotatable core in a takeup chamber of the cartridge.

It is also known to modify such a cartridge to provide for the recording of sound simultaneous with exposure of the film to scene light. In this regard, reference is made to U.S. Pat. No. 3,442,580 issued May 6, 1969 in the name of A. Winkler. Such a cartridge may be loaded with film having a photosensitive emulsion on one surface thereof and a raised stripe of magnetic sound recording material carried by the opposite film surface and disposed adjacent and generally parallel to one longitudinal edge of the film. To facilitate handling and winding of such film into a generally cylindrical roll thereof, a similarly-raised balance stripe may typically be disposed adjacent the opposite longitudinal film edge of the film surface that carries the sound recording stripe. Reference in this regard is made to U.S. Pat. No. 3,220,843 which issued on Nov. 30, 1965 to Mr. R. C. Lovick, et al.

In both of the above-mentioned cartridge arrangements, the film supply roll may exhibit a clockspringing tendency wherein, after winding, successive convolutions of the roll become displaced radially because the inherent resiliency of the film tends to urge the film to an unwound state. Such clockspringing may typically occur where the film is coreless, i.e., not wound around or attached to a central core, or is attached to a central core that is free to rotate with respect to the cartridge. The clockspringing of an unstriped film roll presents no undue difficulties, but a clockspring striped film may develop a "stepped" configuration tending to affect adversely the operation of the cartridge. That is to say: although a striped film is initially wound into a generally cylindrical roll having generally flat roll ends, later clockspringing (radial convolution movement) of the roll reduces the friction force existing between adjacent convolutions, thereby permitting relative axial slippage of such convolutions and producing a roll having "stepped", rather than flat, end faces. If such stepping is of sufficient magnitude to cause a film edge of one convolution to become perched atop the stripe of an adjacent convolution, and if frictional contact between the convolutions is then re-established as by the clockspringing of additional convolutions or by the application of tension to the free end of the rolled strip, the stepped condition becomes essentially permanent because of the wedging action of the stripe. Because a stepped roll has a greater axial length than does an unstepped roll, a stepped roll may exert undue frictional force against the opposed walls of a cartridge supply chamber, especially since such walls are desirably spaced apart by a distance only slightly greater than the width of the film strip in order to minimize the overall cartridge size. Such frictional force may be sufficient to resist or prevent unwinding of the roll in the cartridge thereby resulting in unsatisfactory operation.

The above-cited application Ser. No. 336,142 describes a device for expanding the cartridge supply chamber in response to insertion of the cartridge in a camera, thereby relieving the frictional contact between the roll and the cartridge walls. Although useful, such a device requires additional cartridge structure and accompanying manufacturing expense. Stepping may also be prevented by winding the film roll on a spool having opposed side flanges that tend to restrict axial convolution movement. The use of such a spool in a cartridge of the aforementioned type requires undesirable enlargement of the cartridge in order to accommodate the spool flanges.

SUMMARY OF THE INVENTION

In accordance with the invention, a wound roll of film strip having a photosensitive emulsion layer on one strip face and a raised stripe on the opposite strip face embodies a temporary adhesion at the interface between the raised stripe of one convolution and the adjoining emulsion layer of an adjacent convolution. Where the film is of the type having both sound and balance stripes, such adhesion may advantageously be confined to the balance stripe-emulsion layer interface. Adhesion . . . or tacking . . . in such a roll is produced in accordance with the invention by forming the filmstrip into a roll and by so applying energy to a flat end face of the roll as to cause localized melting of the emulsion layer at the stripe — emulsion interface, whereupon subsequent cooling and rehardening of the emulsion produces adhesion at the interface. In a preferred method of practicing such invention, a wound film roll of the type described is supported at one end face by a supply chamber wall of an unassembled cartridge body. A heating platen may then be placed in contact with the opposite end face of the roll to transfer a desired quantum of heat to the interface to produce the above-mentioned melting and the resultant tack.

BRIEF DESCRIPTION OF THE DRAWINGS

In the detailed description of the preferred embodiment of the invention presented below, reference is made to the accompanying drawings in which:

FIG. 1 is a perspective view of a filmstrip having raised striping thereon;

FIG. 2 is a fragmentary perspective view of a film cartridge operable to house the filmstrip of FIG. 1;

FIG. 3 is an enlarged cross-section through a portion of a cartridge-loaded striped film strip roll and exhibiting undesired stepped convolutions;

FIG. 4 depicts the use of apparatus for forming a tacked film roll;

FIG. 5 is an enlarged cross section through a portion of tacked film roll;

FIG. 6 is a view of apparatus for practicing a preferred method of the invention; and FIG. 7 is a graph depicting information relative to the application of energy to a film roll to produce a tack of the type shown in FIG. 5.

DESCRIPTION OF THE PREFERRED EMBODIMENTS

Because photographic apparatus is well-known, the present description will be directed in particular to elements forming part of, or cooperating more directly with, the present invention, apparatus not specifically shown or described herein being understood to be selectable from those shown in the art.

With reference now to the drawings, FIG. 1 shows a film strip 10 having a plurality of metering perforations 12 spaced along one longitudinal edge 14 of the strip. On one face of the strip is a photosensitive emulsion layer 16 (see FIG. 5) operable to photographically define a plurality of spaced picture areas 18. Such emulsion may be selectable from those that are known in the art and that are meltable upon application of heat. On the opposite face of filmstrip 10 is a raised stripe 20 of magnetic sound recording material disposed between picture areas 18 and the other longitudinal film strip edge 22. On the same filmstrip face as sound recording strip 20, but disposed between the perforations 12 and the film strip edge 14 is a raised balance stripe 24. Typically, the sound recording stripe 20 and the balance stripe 24 may be formed of the same material which may, for example, be a dispersion of iron oxide particles in a suitable binder and meltable, if at all, at a temperature in excess of the melting point of the emulsion. Filmstrip 12 may be formed into a roll 26 thereof, as by known film spooling techniques, and housed in a cartridge 28 of the type shown in FIG. 2. Cartridge 28 is operable for use in a motion picture camera and defines an exposure aperture 30 for use in presenting film 10 for exposure to scene light, and also includes a sound recording aperture 32 for admitting sound recording apparatus into contact with the sound recording stripe 20. Cartridge 28 includes a body member 34 and a cover member defining top 36 and bottom 38 side walls and an end wall 40. In FIG. 2, a portion of top wall 36 is broken away to show a portion of film strip roll 26 housed within a cartridge supply chamber that is defined in part by top wall 36 and by an intermediate wall 42 carried by the cartridge body member 34. As seen in FIG. 2, film strip roll 26 is disposed around a central hub 44 carried by intermediate wall 42, whereby, during advancement of the film 10 through the cartridge, roll 26 may rotate with respect to hub 44 to pay out film 10.

FIG. 3 is a cross-section through a series of convolutions of a wound roll of striped film and depicts an undesirable stepping of film convolutions that may occur after such film roll is loaded in the cartridge. As previously described, a film roll that is initialy wound into a flat-ended roll may, because of movement during packaging or other cartridge handling operations for example, become clocksprung or otherwise exhibit a reduction of interconvolution friction sufficient to permit adjacent convolutions ($c_1$ and $c_2$, for example) to slip relative to each other in a direction parallel to the roll axis A. As seen in FIG. 3, such slippage may so effectively increase the axial length of the film roll as to cause the roll to be in simultaneous contact with both of the supply chamber walls 36 and 42. When interconvolution friction is re-established, as by the clock-springing of other convolutions in the roll or by applying tension to the film during advancement through the cartridge, adjacent convolutions that have slipped a distance sufficient to cause the film edge E of one convolution to engage the face of the raised stripe S of an adjacent convolution (as at $F_1$ and $F_2$) become effectively locked in their stepped relationship. A film roll stepped and locked as described above may generate sufficient frictional force against the cartridge wall as to prevent rotation of the film roll or at least so increase the load required for rotation as to result in improper exposure of the film.

FIG. 4 depicts apparatus for use in producing a film roll that avoids the stepping described above. The apparatus of FIG. 5 is operable to induce heating of the film roll in an amount sufficient to cause concentrated melting of the emulsion layer 16 of one convolution at the interface I of such layer with the raised stripe of an adjacent layer, whereupon subsequent cooling and rehardening of the emulsion produces a tack, or adhesion, at such interface. Such heating may be induced by subjecting the roll to ultrasonic vibration by placing the opposed end faces of the roll in contact, respectively, with an ultrasonic horn and anvil. In the representative apparatus of FIGS. 4 and 5, however, heat is generated by supporting one end face of the roll 26 on a support surface 46 and by applying a heated platen 48 to the opposite end face. Desirably, heat may be applied to the roll end adjacent to balance stripe 24 rather than to the opposite roll end. By so applying the heat, a tack may be formed at the balance stripe 24, while avoiding tacking of the sound recording stripe 20. Since some of the once-melted emulsion may adhere to a tacked stripe after the tack is broken by unwinding the film during use in a camera, avoidance of a tack at the recording stripe assures the absence of emulsion traces that might interfere with intimate sound stripe-recording apparatus contact. Further, in the filmstrip 10 as depicted, the presence of perforations 12 between the balance stripe 24 and the picture area 18 may afford some insulating effect so as to preclude heat damage to the emulsion layer 16 in the picture areas 18.

As seen in FIG. 4, heating platen 48 may comprise a metal disc of a size sufficient to cover the film roll end face. Platen 48 is operably connected to a suitable actuator means M for moving platen 48 into and out of contact with a film roll, and is in communication with a controllable source S of electrical energy operable to heat the platen by electrical resistance.

As seen in FIG. 5, application of platen 48 to an end face of the roll causes transfer of energy quanta Q to the roll to melt the emulsion and form the desired tack. By suitably regulating the temperature of the platen, the pressure exerted by the platen on the film roll, and the time of heat application as shown in the graph of FIG. 7, a tack may be formed that has sufficient adhesion to resist relative movement of the tacked convolutions yet permits the tack to be broken in response to advancement of the film by the camera mechanism. With reference to the graph of FIG. 7, it will be seen that the horizontal axis represents temperature decreasing from left to right, and the vertical axis represents axial distance into the roll from the heated end face. The origin represents the heated edge of the roll and its temperature with the platen in contact. Each of the several curves represents temperature distribution across the width of the film strip for a given platen contact time ($Y_0$, $Y_1$, $Y_2$, $Y_3$) where $Y_3 > Y_2 > Y_1 > Y_0$.

FIG. 6 shows apparatus for use in tacking a film roll in accordance with a preferred method of practicing the invention. In FIG. 6, a suitable holder, or nest, 50 operable to position and support a film cartridge body 34 is disposed beneath the movable platen 48. Platen 48 is mounted for reciprocal movement toward and away from the nest 50 by actuator means M and control C. Platen 48 is resistance heated by suitable circuitry including a power supply terminal 52, a control switch 54, and a conductor 56.

In operation, an unassembled cartridge body 34 is placed in the nest 50. A wound roll 26 of film 10 is placed in the cartridge body in supported relationship with cartridge intermediate wall 42 (an anti-friction disc such as shown in U.S. Pat. No. 3,208,685 issued on Sept. 28, 1965 to E. A. Edwards et al may be interposed between the film roll and wall 42). After positioning, the platen is applied to the exposed end face of the roll for a desired length of time sufficient to melt the emulsion at the magnetic stripe interface. The platen is then withdrawn and the cartridge cover (shown in phantom) is placed in assembled relationship with the body.

In the operation just described, the cartridge itself supports the film roll during tacking so as to eliminate the need to transfer the film roll onto a support surface (46) for tacking and then into the cartridge after tacking is complete.

This invention has been described in detail with a particular reference to the preferred embodiment thereof, but it will be understood that variations and modifications can be effected within the spirit and scope of the invention.

We claim:

1. The method of forming a film-loaded photographic cartridge of the type having a film supply chamber defined in part by an intermediate cartridge wall and by an outer cartridge wall carried, respectively, by a cartridge body and a cartridge cover and comprising the steps of:
   providing a strip of photographic film of the type having a first web face carrying a raised stripe adjacent one longitudinal edge of said strip and a second web face carrying a photosensitive emulsion;
   forming said strip into a roll thereof having a plurality of convolutions;
   supporting an end face of said roll on the intermediate wall of a cartridge body; and
   so applying heat to the opposite end face of said roll as to melt the emulsion layer of one convolution at the interface thereof with the raised stripe of an adjacent convolution to cause said convolutions to adhere at said interface.

2. The method of forming a film roll having a plurality of convolutions wherein adjacent convolutions in said roll are operable to resist relative movement therebetween comprising the steps of:
   providing an elongate strip of film having, on one strip face a rasied stripe disposed adjacent one longitudinal edge of said strip and having, on the other strip face, a heat-meltable photosensitive emulsion;
   forming said strip into a roll thereof having a plurality of adjoining convolutions;
   supporting said roll on one end face thereof;
   so applying energy to the opposite end face thereof so as to melt the emulsion layer of one convolution at the interface thereof with the raised stripe of an adjacent convolution to cause said convolutions to adhere at said interface.

3. The method of claim 2 wherein said energy-applying step includes the step of applying of ultrasonic energy to said roll to melt said emulsion at said interface.

4. The method of claim 3 wherein said energy-applying step includes the step of applying a heated member to said roll end to melt said emulsion at said interface.

* * * * *